(No Model.) 2 Sheets—Sheet 2.
C. SCHWEER.
SULKY PLOW.
No. 299,020. Patented May 20, 1884.
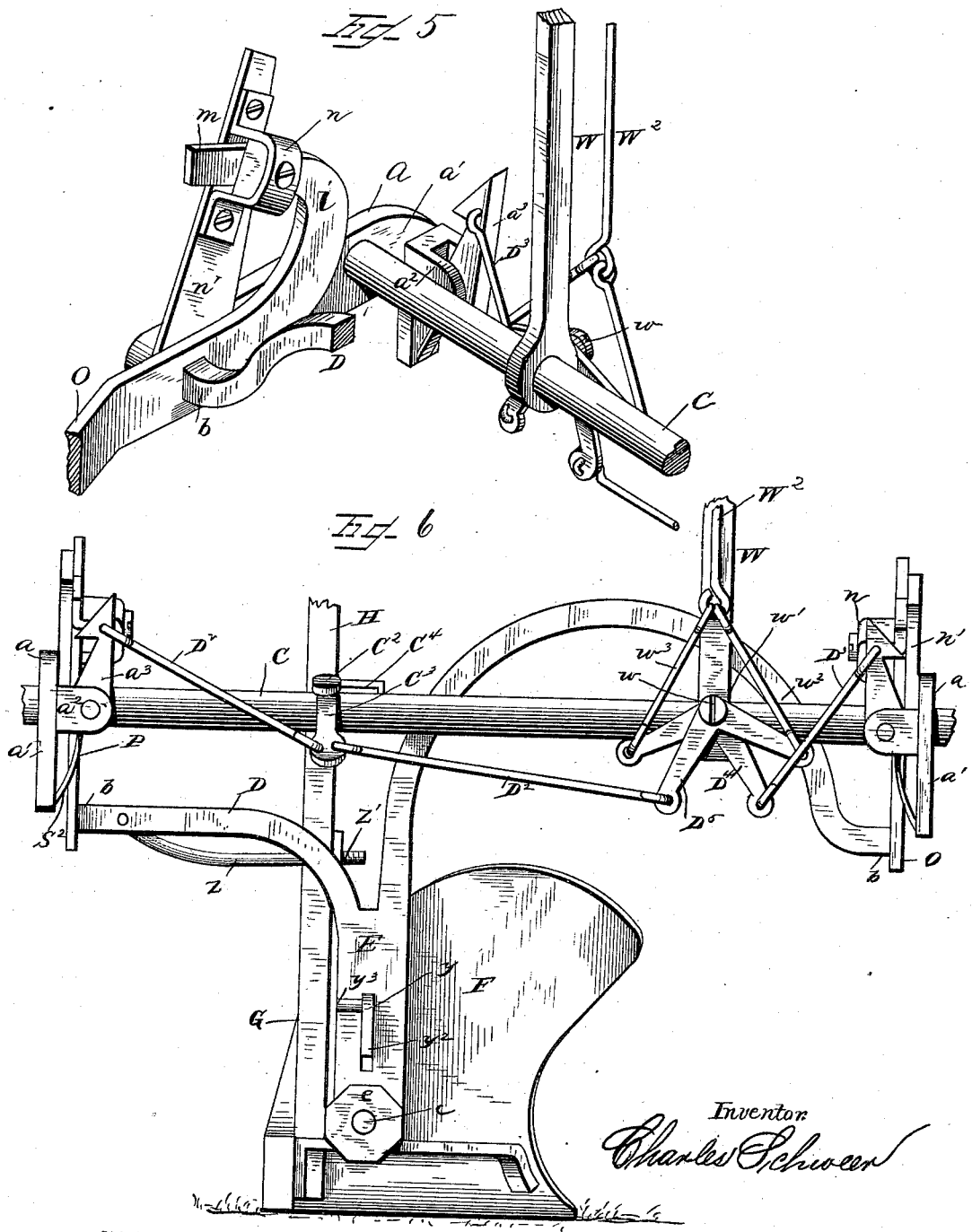
Witnesses
Franck L. Ourand
E. M. Johnson
Inventor
Charles Schweer
Attorney

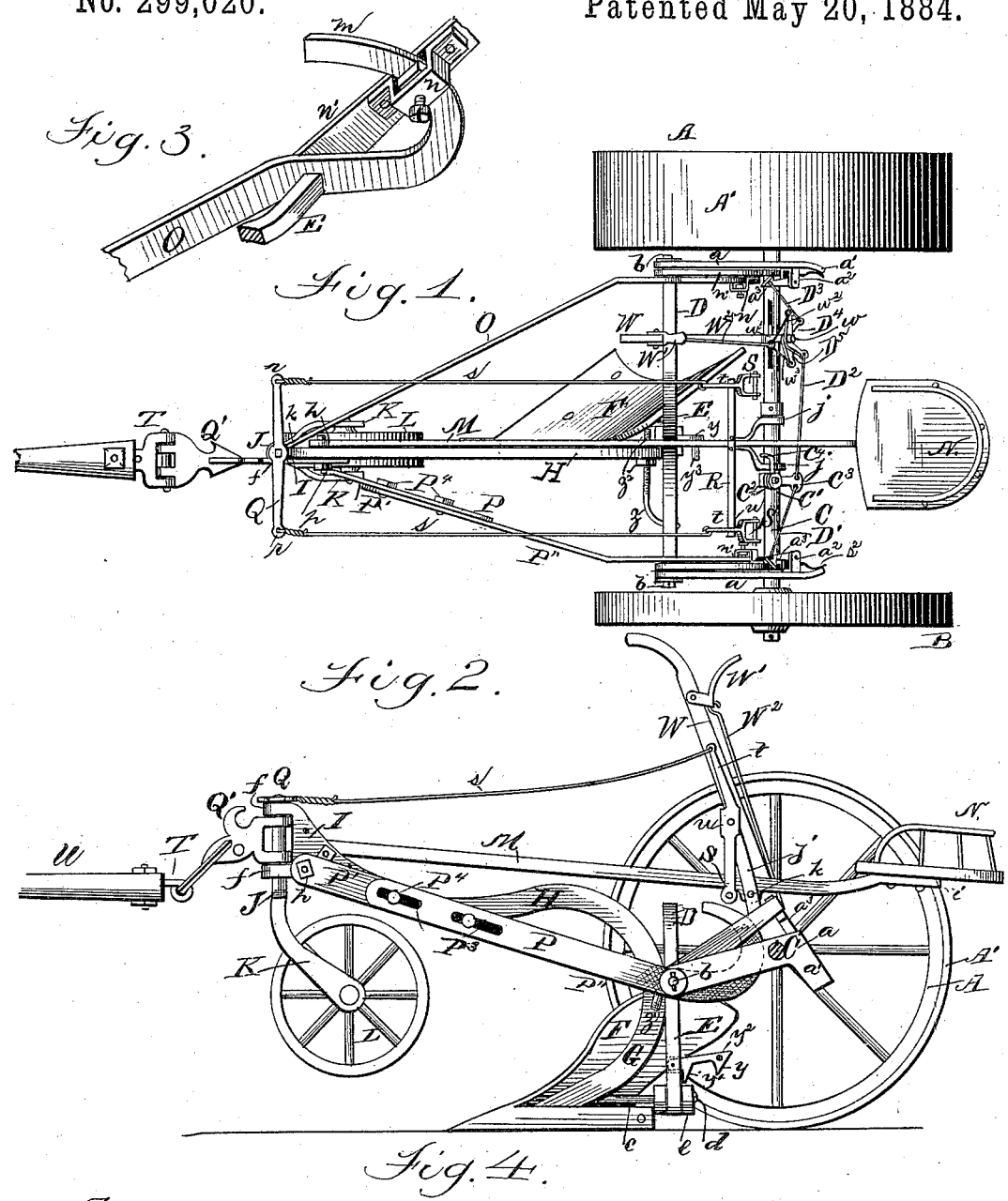

UNITED STATES PATENT OFFICE.

CHARLES SCHWEER, OF ELDON, IOWA.

SULKY-PLOW.

SPECIFICATION forming part of Letters Patent No. 299,020, dated May 20, 1884.

Application filed November 1, 1883. (No model.)

*To all whom it may concern:*

Be it known that I, CHARLES SCHWEER, a citizen of the United States of America, residing at Eldon, in the county of Wapello, and State of Iowa, have invented certain new and useful Improvements in Sulky-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to sulky-plows; and it consists in the improved construction fully described hereinafter, whereby the elevation and lowering of the plow proper is readily effected by the driver from the seat, the vertical adjustment of the plow-supporting frame with respect to the carrying-frame easily secured, and the manipulation of the guide-wheel from the seat secured.

In the accompanying drawings, Figure 1 is a plan view of a sulky-plow constructed in accordance with my invention. Fig. 2 is a side view of the same. Figs. 3 and 4 are detailed views, and Figs. 5 and 6 are enlarged detail views.

The carrying-wheels A B are mounted and turn on the axle C. A bar, *a*, is keyed on the axle near each wheel A B, and projects toward the forward end of the plow to support the ends *b* of a transverse yoke-bar, D, the said yoke-bar D being bent in the center to form the vertical portion E, the lower end of which is perforated to receive the end of a rod, *c*, secured to the mold-board F of the plow, and threaded at its end *d* to engage a securing-nut, *e*.

The plow proper is secured to the lower end of the vertical curved portion G of the beam H, to the forward end of which is secured a bracket, I, the ears *f* of which are perforated for the passage of a neck, J, of a yoke, K, carrying a caster-wheel, L.

A beam, M, is secured at its forward end, *h*, to the forward end of the plow-beam H, and extends rearwardly back of the axle C to support at its extremity *i* the operator's seat N. The said beam M is braced and supported by being located between vertically-inclined braces *j j*, secured at their lower ends to the axle C and perforated for the passage of a securing-pin, *k*, which also passes through a perforation therefor in the beam M. The lower ends of the vertically-inclined braces *j j* are spread some distance apart, for the purpose hereinafter described.

A diagonal brace, O, is secured at its forward end, *k*, to the side of the bracket I, its rear portion, *i*, being curved approximately in a hook shape, the terminal portion *m* of which passes through a yoke-bracket, *n*, bolted to the upper portion of a bar, *n'*, secured at its lower end to the end *b* of the yoke-frame D, and lying almost parallel with the bar *a*, located on that side of the machine, a set-screw piercing said yoke-bracket *n* to rigidly secure the curved portion of the brace O therein. One of the ends *b* of the transverse yoke-bar D passes through a perforation therefor in the brace O at a point where the hook portion thereof commences. A second diagonal brace, P, located on the other side of the plow-beam H is bolted at its front end, *p*, to the bracket I, and extends back and terminates in a hook similar to that of the brace O, which passes through a yoke-bracket secured to the side of a second bar, *n'*, secured at its lower end to one end *b* of the yoke-frame D, and lying almost parallel with the bar *a*, Fig. 2, located on that side of the machine, a set-screw being provided for the said yoke-bracket for rigidly securing the curved portion of the brace P. The brace P is also perforated for the passage of one of the ends *b* of the transverse yoke-bar. The upper end of the neck J of the caster-yoke K has centrally secured thereto a horizontal bar, Q, which is perforated at its ends *r* for the attachment of cords or cables *s*, which extend back and are each secured to the upper end of a vertical bar, *t*, centrally pivoted on one end, *u*, of a horizontal rod, R, rigidly secured at its center to the upper ends of the vertical braces *j j*. The lower end of each bar *t* terminates in a stirrup, S.

The clevis Q' has hinged thereto a short perforated tongue, T, which is adapted to be clamped to the draft-tongue proper, U, of the machine.

The diagonal brace P consists of two sections, P' P'', which are each provided with elongated slots P''', which permit the extension of said brace P, the sections being firmly clamped with respect to each other by means of bolts or nuts P''''.

A sleeve, C, Fig. 1, rigidly secured on the shaft C and at one side of one of the vertical braces j, is provided with a stud, C'', upon which is pivoted the elbow of a bell-crank lever, C''', one portion, C'''', is bent to permit its end to normally rest upon the axle C. The other portion of the bell-crank lever extends out at right angles to the rear of the axle, and is perforated at its end for the engagement of the hooked ends of two rods, D' D''', respectively, extending off toward each side of the machine. Portions a' of each bar a extend downward in an inclined direction at the rear of the ends of the axle C, and each carry a bracket, a'', within which is pivoted a dog, a''', perforated at its head. The perforation of the dog a''', on the side of which the diagonal brace P is located, is engaged by the outer hooked end of the rod D', while the perforation of the dog located on the side of the machine on which the brace O is arranged is engaged by the outer hooked end of a rod, D''''', the other end of which is pivoted to one end of a bell-crank lever, D$^4$, pivoted at its elbow upon a stud, w, projecting from the base w' of a hand-lever, W, which is keyed on the shaft C.

Near the upper end of the lever W is pivoted a small handle, W', connected to which is the upper end of a rod, W$^2$, the lower end of which is looped to receive the upper ends of links w$^2$ w$^3$, the lower end of the link w$^3$ being connected to the end, not before referred to, of the bell-crank lever D$^4$, while the other link, w$^2$, is connected at its lower end to one end of a bell-crank lever, D$^5$, also pivoted at its elbow upon the stud w, the other end of the said bell-crank lever D$^5$ engaging the end of the rod D$^2$ nearest the handle W'.

Leaf-springs s$^2$, bearing on the inner sides of each extension a' of the bars a and between the lower portion of each dog a$^3$, serve to normally throw the upper ends of the said dogs outward in the direction of the extremities of the axle C.

In the lower part of the vertical portion E of the transverse yoke-frame D is a slot, (shown by dotted lines in Fig. 2, and full lines, Fig. 6,) within which is pivoted the rear end of a pawl, y, having a lip, y', which bears against the rear face of the vertical portion E of the yoke-frame D. The pawl y has a head, y$^2$, at its extremity, which carries at one side a horizontal pin, y$^3$.

A curved rod, z, is secured at one side of the yoke-frame D, and extends so as to permit its threaded end z' to pass through a perforation therefor in the beam H, in which position it is securely clamped by nuts z$^2$.

The carrying-wheel A being mounted on the side of the machine in which the plowed land is, the said wheel is furnished with a broad auxiliary tire, A', which prevents said wheel from sinking into the loose ground.

When it is desired to elevate the plow so as to clear the ground, the hand-lever W is moved back, turning the shaft C rearwardly and lifting the outer ends of the bars a a, which elevates the yoke-frame, plow proper, and parts connected thereto, so that the head y$^2$ of the pawl y strikes the shaft C, and, being raised, drops over in engagement with said shaft, suspending the plow in an elevated position. The pin y$^3$ of the head y$^2$, when said head engages the shaft C, bears on the upper side of the portion C$^4$ of the bell-crank lever C$^3$.

When it is desired to cause the plow proper to descend to its working position, the handle W' is forced toward the lever W, causing a vertical movement of the rod W$^2$ and links w$^2$ w$^3$, the link w$^2$ operating the bell-crank lever D$^5$ to draw on the rod D$^2$, thereby tilting the bell-crank lever C$^3$ on its pivot, and causing its end C$^4$ to raise the pawl y from its engagement with the shaft C, and permitting the plow to drop to a working position. The lever W and appurtenances, and the rods, dogs, and bell-crank levers being all connected together, the leaf-springs effect the return of the dogs to their normal position and the return of the extension C$^4$ of the bell-crank lever C$^3$ to its bearing upon the axle. By moving the lever W forward and rotating the axle in a direction reverse to that above described, the bars a a are thrown downward and cause the upper ends of the bars n' to be also moved downward toward the dogs a$^3$, which engage the ends of the said bars n' and hold the carriage in its elevated position, the plow proper and yoke-frame having served as a fulcrum for such elevation of the carriage. By adjusting the said bars n' on the curved ends m by means of the clamping-yokes n and set-screws of the braces O P, the said bars are caused to elevate the carriage to a greater or less degree before they are engaged by the dogs a$^3$.

By adjusting the extension-brace P so as to be of greater or less length, one side of the carriage can be turned to or from the land side more than the other, which is desirable where the mold-board is to enter the soil at an incline.

By operating either one of the bars t, the movement of the guide-wheel to the right or left is effected.

The arrangement of the clevis described permits its ready connection to the draft-tongue, and a connection that in no way communicates to the plow the movements of said tongue.

From the foregoing description it will be apparent that the sulky-plow described is effective in operation, and may be easily manipulated to secure the various adjustments desired.

I claim—

1. The combination, in a sulky-plow, of the carriage having a main axle and carrying-wheels mounted on the ends thereof, a frame pivoted to the carrying-frame and supporting the plow proper, a pivoted pawl located at the lower portion of the plow-supporting frame, devices located on the main frame for raising the plow-supporting frame, so as to permit said pivoted pawl to engage the main axle and suspend the plow-supporting frame, and a bell-crank lever pivoted on the main frame, and having one portion located on the point of the main axle which the pivoted pawl engages, and connections on the main carriage connected to said bell-crank lever to move the same upon its pivot, substantially as and for the purpose set forth.

2. The combination, in a sulky-plow, of a carriage, of bars located at each side, keyed on the main axle, and extending forwardly, a plow-supporting frame pivotally secured to the forward ends of said bars, and provided with bars $n'$, spring-dogs located on the said bars of the main carriage, and devices for depressing the plow-supporting frame to cause the bars thereof to engage the said spring-dogs, substantially as set forth.

3. The combination, in a sulky-plow, of a carriage, a plow-frame pivoted thereto, provided with arms $n'$ and braces O P, as described, and carrying the plow, a lever fulcrumed on the carriage-frame for effecting by its movement the elevation or depression of the plow-frame, and spring-dogs located on the carriage, and adapted to engage the arms $n'$ for locking said plow-frame in its elevated position, substantially as set forth.

4. The combination, in a sulky-plow, of a carriage, a plow-supporting frame pivoted thereto, and provided with brace-rods O P, having curved or hooked ends $l$, adapted to be adjustably clamped in yoke-brackets $n$, secured to the side of bars $n'$, secured to the plow-frame, spring-dogs located on the carriage, connections and devices for effecting the elevation of the carriage and the engagement of the spring-dogs with the rods $n'$, and devices for effecting a disengagement of the same, substantially as specified.

5. The combination, in a sulky-plow, of a main carriage, a plow-supporting frame pivoted to said main carriage, levers and connections mounted on said main carriage to effect the elevation and depression of the plow-supporting frame, a guide-wheel supported in a yoke turning in bearings at the front of the machine, and having connected therewith a horizontal bar, each end of which is connected by a cable with a centrally-pivoted vertical bar provided with a stirrup at its lower end, each to receive one of the feet of the operator, substantially as set forth.

In testimony whereof I affix my signature in presence of two witnesses.

CHARLES SCHWEER.

Witnesses:
S. M. HANSHAW,
SENECA CORNELL.